US006506488B1

(12) United States Patent
Stewart et al.

(10) Patent No.: US 6,506,488 B1
(45) Date of Patent: Jan. 14, 2003

(54) AMINOPLAST RESIN PHOTOCHROMIC COATING COMPOSITION AND PHOTOCHROMIC ARTICLES

(75) Inventors: Kevin J. Stewart, Murrysville, PA (US); Jeanine A. Conklin, Swissvale, PA (US); Cletus N. Welch, Murrysville, PA (US); James B. O'Dwyer, Valencia, PA (US); Shanti Swarup, Allison Park, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 0 days.

(21) Appl. No.: 09/449,099

(22) Filed: Nov. 24, 1999

Related U.S. Application Data

(60) Provisional application No. 60/112,794, filed on Dec. 18, 1998.

(51) Int. Cl.[7] ......................... B32B 27/00; C08G 12/00; C09K 9/02; G02F 1/17

(52) U.S. Cl. .................... 428/332; 428/411.1; 428/412; 428/423.1; 428/426; 428/436; 428/457; 428/500; 428/501; 428/502; 428/506; 428/532; 428/537.1; 428/923; 428/926

(58) Field of Search .............................. 428/220, 411.1, 428/412, 423.1, 426, 457, 436, 500, 501, 502, 506, 532, 537.1, 923, 926, 332

(56) References Cited

U.S. PATENT DOCUMENTS

| | | | | |
|---|---|---|---|---|
| 3,361,706 A | | 1/1968 | Meriwether et al. | 260/39 |
| 4,367,170 A | | 1/1983 | Uhlmann et al. | 252/586 |
| 4,714,657 A | * | 12/1987 | Quinn et al. | 428/412 |
| 4,720,356 A | | 1/1988 | Chu | 252/586 |
| 4,756,973 A | | 7/1988 | Sakagami et al. | 428/412 |
| 4,808,656 A | | 2/1989 | Kania et al. | 524/512 |
| 4,873,029 A | | 10/1989 | Blum | 264/1.3 |
| 4,931,220 A | | 6/1990 | Haynes et al. | 252/586 |
| 5,391,327 A | | 2/1995 | Ligas et al. | 252/586 |
| 5,602,198 A | | 2/1997 | Das et al. | 524/509 |
| 5,645,767 A | | 7/1997 | Gemert | 252/586 |
| 5,658,501 A | | 8/1997 | Kumar et al. | 252/586 |
| 5,770,115 A | | 6/1998 | Misura | 252/586 |
| 6,060,001 A | | 5/2000 | Welch et al. | 252/586 |
| 6,187,444 B1 | | 2/2001 | Bowles, III et al. | 428/423.1 |

FOREIGN PATENT DOCUMENTS

| | | |
|---|---|---|
| JP | 61-268788 | 11/1986 |
| JP | 62-226134 | 10/1987 |
| JP | 3-2864 | 1/1991 |
| JP | 3-35236 | 2/1991 |
| WO | WO98/37115 | 8/1998 |

* cited by examiner

*Primary Examiner*—Stevan A. Resan
(74) *Attorney, Agent, or Firm*—Frank P. Mallak

(57) ABSTRACT

Described are articles having an aminoplast resin photochromic coating prepared from an aminoplast resin, components(s) having hydroxyl functional groups and photochromic substances. The coatings exhibit a Fischer microhardness of from 45 to 180 Newtons per $mm^2$ and desirable photochromic properties, i.e., the formation of darker activated colors and faster rates of photochromic activation and fade when irradiated with ultraviolet light. Also described are photochromic aminoplast resin articles.

25 Claims, No Drawings

AMINOPLAST RESIN PHOTOCHROMIC COATING COMPOSITION AND PHOTOCHROMIC ARTICLES

CROSS REFERENCE TO RELATED APPLICATIONS

This application claims priority to Provisional Application Ser. No. 60/112,794, filed Dec. 18, 1998.

DESCRIPTION OF THE INVENTION

The present invention relates to coatings comprising an aminoplast resin, component(s) having hydroxyl functional groups and photochromic substance(s), hereinafter referred to as photochromic aminoplast resin coatings. In particular, this invention relates to articles coated with such photochromic coatings and photochromic articles, i.e., polymerizates, made from such polymerizable compositions. More particularly, this invention relates to certain photochromic aminoplast resin coatings which when present on a substrate and exposed to activating light radiation exhibit improved photochromic properties. Further, this invention relates to photochromic aminoplast resin coatings that meet commercially acceptable "cosmetic" standards for optical coatings applied to optical elements, e.g., lenses.

Photochromic compounds exhibit a reversible change in color when exposed to light radiation involving ultraviolet rays, such as the ultraviolet radiation in sunlight or the light of a mercury lamp. Various classes of photochromic compounds have been synthesized and suggested for use in applications in which a sunlight-induced reversible color change or darkening is desired. The most widely described classes of photochromic compounds are oxazines, pyrans and fulgides.

The use of melamine resins as a potential matrix for photochromic compounds in multilayered articles has been disclosed in U.S. Pat. No. 4,756,973 and Japanese patent applications 62-226134, 3-2864 and 3-35236. In U.S. Pat. No. 4,756,973 and JP 62-226134, melamine resin is referred to in a list of different materials, but specific examples of melamines and reactants to produce photochromic coatings are not disclosed. JP 3-2864 and 3-35236 disclose examples of melamine photochromic coatings, but information necessary to duplicate the examples is not included in the applications.

JP 61-268788 discloses a photochromic coating composition consisting of spironaphthoxazine, polyol condensed melamine and a polymer or copolymer of a vinyl compound containing a hydroxyl group. Comparative Examples 6–10 herein represent the examples of JP 61-268788. Lenses prepared with the coatings of Comparative Examples 6–10 demonstrate cosmetic defects and/or have performance properties outside of the desired range. The photochromic aminoplast coatings prepared with the Examples of the present invention were prepared by mixing all of the ingredients together instead of using the additional step of JP 61-268788, which is to condense a polyol with the melamine resin prior to adding the other ingredients.

It has now been discovered that photochromic aminoplast resin coatings that demonstrate good photochromic properties, i.e., color and fade at acceptable rates and achieve a sufficiently dark colored state, and that meet optical coating "cosmetic" standards may be produced. Such coatings enable the production of photochromic articles using plastics in which photochromic compounds do not function properly, and avoids the use of thermal transfer processes.

The novel coatings described herein exhibit a Fischer microhardness of from at least 45 to 180 Newtons per $mm^2$. Articles of the present invention having this range of hardness are suitable for manipulation by automated process equipment without being damaged. The photochromic aminoplast coating composition used to form the photochromic coating may also be used to form a photochromic aminoplast resin polymerizate.

DETAILED DESCRIPTION OF THE INVENTION

In recent years, photochromic articles, particularly photochromic plastic materials for optical applications, have been the subject of considerable attention. In particular, photochromic ophthalmic plastic lenses have been investigated because of the weight advantage they offer, vis-a-vis, glass lenses. Moreover, photochromic transparencies for vehicles, such as cars and airplanes, have been of interest because of the potential safety features that such transparencies offer. Photochromic articles that are most useful are those in which the photochromic compounds associated with the article exhibit a high activated intensity and acceptable coloration and fade rates.

The use of photochromic coatings enables the preparation of photochromic plastic articles without the need to incorporate the photochromic compound(s) into the plastic substrate. This is advantageous when the plastic, e.g., thermoplastic polycarbonate, does not have enough internal free volume or polymer chain flexibility for the photochromic compounds incorporated into the plastic to function properly. Further, use of photochromic coatings result in more efficient utilization of photochromic compounds. The losses associated with more conventional transfer methods, e.g., imbibition or permeation, are avoided as well as the costs associated with the disposal of spent photochromic dye solutions.

Other than in the operating examples, or where otherwise indicated, all values, such as those expressing wavelengths, quantities of ingredients, ranges or reaction conditions, used in this description and the accompanying claims are to be understood as modified in all instances by the term "about".

When the coating compositions of the present invention are applied as a coating and cured, the coating exhibits a Fischer microhardness of at least of 45 Newtons per $mm^2$, preferably at least 55, more preferably at least 60 Newtons per $mm^2$. Typically, the cured coating exhibits a Fischer microhardness of not more than 180 Newtons per $mm^2$, preferably not more than 160 and more preferably not more than 150 Newtons per $mm^2$. The Fischer microhardness of the coating may range between any combination of these values, inclusive of the recited range.

The photochromic properties of the cured coating of the present invention are characterized by a $\Delta$OD after 30 seconds of at least 0.15, preferably at least 0.16 and most preferably at least 0.17, and a $\Delta$OD after 8 minutes of at least 0.47, preferably 0.50, and most preferably at least 0.55. The photochromic properties also are characterized by a bleach rate of not more than 180 seconds, preferably not more than 140, and more preferably not more than 100 seconds—all as measured at 85° F. (29.4° C.), and as described in Part D of Example 16 herein.

Aminoplast resin coatings having microhardness and photochromic performance properties within the aforestated ranges can be produced by balancing the amounts of the components of the crosslinkable composition used to prepare the coating matrix. For example, the specific properties of the components comprising the coating matrix or polymerizate that will effect the microhardness and photochromic performance properties of the aminoplast resin matrix are the glass transition temperature and molecular weight of the components, and the crosslink density of the resultant matrix. Generally, using components having higher glass transition temperatures and molecular weights results in coatings and polymerizates having an increased microhardness and vice versa. An increase in the number of reactive groups of a component will also cause an increase in the microhardness, provided that all of the groups are reacted. In the latter case, the increase in the number of reactive groups, i.e., crosslinking sites, increases the density of the cured coating. It is believed however that the harder the coating or polymerizate the slower the performance of the photochromic compound contained therein.

The contribution of a particular component, e.g., a hydroxyl-functional component such as an organic polyol, to either the hardness or softness of the coating can be readily determined by measuring the Fischer microhardness of the resulting aminoplast resin coating. The hardness-producing component, as defined herein, is a component that increases the microhardness of the aminoplast resin coating as its concentration increases. Similarly, the softness-producing component, as defined herein, is a component that decreases the microhardness of the aminoplast resin coating as its concentration increases. Examples of hardness-producing organic polyols include, but are not limited to, low molecular weight polyols, amide-containing polyols, polyhydric polyvinyl alcohols, e.g., poly(vinylphenol), epoxy polyols and polyacrylic polyols. Softness-producing organic polyols include, but are not limited to, polyester polyols, urethane polyols, and polyether polyols, e.g., polyoxyalkylenes and poly(oxytetramethylene)diols. All of the aforementioned polyols are defined hereinafter.

The photochromic coating composition of the present invention may be prepared by combining a photochromic component with the reaction product of hydroxyl-functional component(s) having at least two functional groups and an aminoplast resin, i.e., crosslinking agent. The coating composition may further include catalyst.

Solvents may also be present in the coating composition. However, as described herein, solvents are not factored into the weight ratios and weight percents stated herein. All weight ratios and weight percents used herein are based on the total solids in the coating composition, unless stated otherwise.

Typically, the component having a plurality of hydroxyl groups of the present invention is a film forming polymer, but a component which is not a film forming polymer may be utilized. However, it is necessary that at least the combination of the aminoplast resin component with the component having a plurality of hydroxyl groups results in a crosslinked polymeric coating.

The functional group containing component(s), hereinafter referred to as the functional component, has at least two pendant and/or terminal hydroxyl groups. The component having such functional groups may be a monomer, polymer, oligomer, or mixture thereof. Preferably, the component is a polymer or oligomer such as an acrylic polymer, a polyester polymer or oligomer, or a blend of two or more of these materials. Acrylic polymers or oligomers are preferred materials.

The acrylic materials of the functional component are copolymers of one or more alkyl esters of acrylic acid or methacrylic acid and hydroxyl functional components, and, optionally, one or more other polymerizable ethylenically unsaturated monomers. Suitable alkyl esters of acrylic or methacrylic acids, i.e., alkyl esters of (meth)acrylic acids, having from 1 to 17 carbon atoms in the alkyl group, include methyl methacrylate, ethyl methacrylate, butyl methacrylate, ethyl acrylate, butyl acrylate, and 2-ethylhexyl acrylate. Suitable copolymerizable ethylenically unsaturated monomers include vinyl aliphatic compounds; vinyl aromatic compounds; (meth)acrylamidobutyraldehyde dialkyl acetal monomers such as acrylamidobutyraldehyde diethyl acetal (ABDA) and methacrylamidobutyraldehyde diethyl acetal (MABDA) monomers; poly(alkylene glycol)(meth) acrylate, e.g., methoxy polyethylene glycol monomethacrylate; nitriles such as acrylonitrile and methacrylonitrile; vinyl and vinylidene halides; vinyl esters; acid functional comonomers such as acrylic and methacrylic acid; and mixtures of such ethylenically unsaturated monomers. A further description of selected ethylenically unsaturated monomers is included hereinafter in relation to the preparation of polyacrylic polyols.

Hydroxyl functional components that may be copolymerized with the acrylic monomers to prepare the functional component of the present invention include, but are not limited to, (a) low molecular weight polyols, i.e., polyols having a weight average molecular weight less than 500, e.g., aliphatic diols, such as $C_2$–$C_{10}$ aliphatic diols, triols and polyhydric alcohols; (b) polyester polyols; (c) polyether polyols; (d) amide-containing polyols; (e) polyacrylic polyols; (f) polyhydric polyvinyl alcohols; (g) epoxy polyols; (h) urethane polyols; and (i) mixtures of such polyols. Preferably, the organic polyols are selected from the group consisting of low molecular weight polyols, polyacrylic polyols, polyether polyols, polyester polyols and mixtures thereof. More preferably, the organic polyols are selected from the group consisting of polyacrylic polyols, polyester polyols, polyether polyols, and mixtures thereof, and most preferably polyacrylic polyols, polyether polyols and mixtures thereof. As used herein, the term "polyol" is meant to include materials having at least two hydroxyl groups.

Examples of low molecular weight polyols that can be used in the coating composition of the present invention include: tetramethylolmethane, i.e., pentaerythritol; trimethylolethane; trimethylolpropane; di-(trimethylolpropane); dimethylolpropionic acid; 1,2-ethanediol, i.e., ethylene glycol; 1,2-propanediol, i.e., propylene glycol; 1,3-propanediol; 2,2-dimethyl-1,3-propanediol, i.e., neopentyl glycol; 1,2,3-propanetriol, i.e., glycerin; 1,2-butanediol; 1,4-butanediol; 1,3-butanediol; 1,2,4-butanetriol; 1,2,3,4-butanetriol; 2,2,4-trimethyl-1,3-pentanediol; 1,5-pentanediol; 2,4-pentanediol; 1,6 hexanediol; 2,5-hexanediol; 1,2,6 hexanetriol; 2-methyl-1,3 pentanediol; 2,4-heptanediol; 2-ethyl-1,3-hexanediol; 1,4-cyclohexanediol; 1-(2,2-dimethyl-3-hydroxypropyl)-2,2-dimethyl-3-hydroxypropionate; hexahydric alcohol, i.e., sorbitol; diethylene glycol; dipropylene glycol; 1,4-cyclohexanedimethanol; 1,2-bis(hydroxymethyl) cyclohexane; 1,2-bis (hydroxyethyl)-cyclohexane; bishydroxypropyl hydantoins; TMP/epsilon-caprolactone triols; hydrogenated bisphenol A; tris hydroxyethyl isocyanurate; the alkoxylation product of 1 mole of 2,2-bis(4-hydroxyphenyl)propane (i.e., bisphenol-A) and 2 moles of propylene oxide; ethoxylated or propoxylated trimethylolpropane or pentaerythritol having a number average molecular weight less than 500, and mixtures of such low molecular weight polyols.

Polyester polyols are known and can have a number average molecular weight in the range of from 500 to 10,000. They are prepared by conventional techniques utilizing low molecular weight diols, triols and polyhydric alcohols known in the art, including but not limited to the previously described low molecular weight polyols (optionally in combination with monohydric alcohols) with polycarboxylic acids.

Examples of suitable polycarboxylic acids for use in preparing the polyester include: phthalic acid, isophthalic acid, terephthalic acid, tetrahydrophthalic acid, tetrachlorophthalic acid, hexahydrophthalic acid, methylhexahydrophthalic acid, adipic acid, azelaic acid, sebacic acid, maleic acid, succinic acid, glutaric acid, fumaric acid, chlorendic acid, trimellitic acid, tricarballylic acid and mixtures thereof. Anhydrides of the above acids, where they exist, can also be employed. In addition, certain materials which react in a manner similar to acids to form polyester polyols are also useful. Such materials include lactones, e.g., caprolactones, propiolactone and butyrolactone, and hydroxy acids such as hydroxycaproic acid and dimethylol propionic acid. If a triol or polyhydric alcohol is used, a monocarboxylic acid, such as acetic acid and/or benzoic acid, may be used in the preparation of the polyester polyols, and for some purposes, such a polyester polyol may be desirable. Moreover, polyester polyols are understood herein to include polyester polyols modified with fatty acids or glyceride oils of fatty acids (i.e., conventional alkyd polyols containing such modification). Another polyester polyol which may be utilized is one prepared by reacting an alkylene oxide, e.g., ethylene oxide, propylene oxide, etc., and the glycidyl esters of versatic acid with methacrylic acid to form the corresponding ester.

Polyether polyols are known and may have a number average molecular weight in the range of from 500 to 10,000. Examples of polyether polyols include various polyoxyalkylene polyols, polyalkoxylated polyols having a number average molecular weight greater than 500, e.g., poly(oxytetramethylene)diols and mixtures thereof. The polyoxyalkylene polyols can be prepared, according to well-known methods, by condensing alkylene oxide, or a mixture of alkylene oxides using acid or base catalyzed addition, with a polyhydric initiator or a mixture of polyhydric initiators such as ethylene glycol, propylene glycol, glycerol, sorbitol and the like. Illustrative alkylene oxides include ethylene oxide, propylene oxide, butylene oxide, e.g., 1,2-butylene oxide, amylene oxide, aralkylene oxides, e.g., styrene oxide, and the halogenated alkylene oxides such as trichlorobutylene oxide and so forth. The more preferred alkylene oxides include butylene oxide, propylene oxide and ethylene oxide or a mixture thereof using random or stepwise oxyalkylation. Examples of such polyoxyalkylene polyols include polyoxyethylene, i.e., polyethylene glycol, polyoxypropylene, i.e., polypropylene glycol and polyoxybutylene, i.e., polybutylene glycol. The number average molecular of such polyoxyalkylene polyols used as the soft segment is equal to or greater than 600, more preferably, equal to or greater than 725, and most preferably, equal to or greater than 1000.

The polyether polyols also include the known poly(oxytetramethylene)diols prepared by the polymerization of tetrahydrofuran in the presence of Lewis acid catalysts such as boron trifluoride, tin (IV) chloride and sulfonyl chloride. The number average molecular weight of poly(oxytetramethylene)diols used as the soft segment ranges from 500 to 5000, preferably from 650 to 2900, more preferably from 1000 to 2000, and most preferably is 1000.

Polyalkoxylated polyols having a number average molecular weight greater than 500 may be represented by the following general formula I,

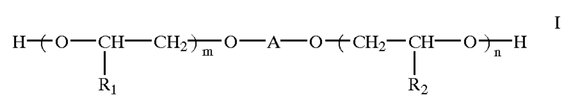

wherein m and n are each a positive number, the sum of m and n being from 5 to 70, $R_1$ and $R_2$ are each hydrogen, methyl or ethyl, preferably hydrogen or methyl and A is a divalent linking group selected from the group consisting of straight or branched chain alkylene (usually containing from 1 to 8 carbon atoms), phenylene, $C_1$–$C_9$ alkyl substituted phenylene and a group represented by the following general formula II,

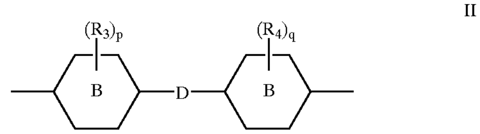

wherein $R_3$ and $R_4$ are each $C_1$–$C_4$ alkyl, chlorine or bromine, p and q are each an integer from 0 to 4,

B represents a divalent benzene group or a divalent cyclohexane group, and D is O, S, —$S(O_2)$—, —C(O)—, —$CH_2$—, —CH=CH—, —$C(CH_3)_2$—, —$C(CH_3)(C_6H_5)$— or

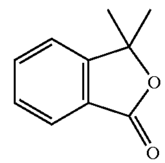

when

B is the divalent benzene group, and D is O, S, —$CH_2$—, or —$C(CH_3)_2$— when

B is the divalent cyclohexane group. Preferably, the polyalkoxylated polyol is one wherein the sum of m and n is from 15 to 40, e.g., 25 to 35, $R_1$ and $R_2$ are each hydrogen, and A is a divalent linking group according to general formula II wherein

B represents a divalent benzene group, p and q are each 0, and D is —$C(CH_3)_2$—, and most preferably, the sum of m and n is from 25 to 35, e.g., 30. Such materials may be prepared by methods which are well known in the art. One such commonly used method involves reacting a polyol, e.g., 4,4'-isopropylidenediphenol, with an oxirane containing substance, for example ethylene oxide, propylene oxide, α-butylene oxide or β-butylene oxide, to form what is commonly referred to as an ethoxylated, propoxylated or butoxylated polyol having hydroxy functionality.

Examples of polyols suitable for use in preparing the polyalkoxylated polyols include the low molecular weight polyols described herein; phenylene diols such as ortho, meta and para dihydroxy benzene; alkyl substituted phenylene diols such as 2,6-dihydroxytoluene, 3-methylcatechol, 4-methylcatechol, 2-hydroxybenzyl alcohol, 3-hydroxybenzyl alcohol, and 4-hydroxybenzyl alcohol; dihydroxybiphenyls such as 4,4'-dihydroxybiphenyl and 2,2'-dihydroxybiphenyl; bisphenols such as 4,4'-isopropylidenediphenol; 4,4'-oxybisphenol; 4,4'-dihydroxybenzenephenone; 4,4'-thiobisphenol; phenolphthalein; bis(4-hydroxyphenyl)methane; 4,4'-(1,2-ethenediyl)bisphenol; and 4,4'-sulfonylbisphenol; halogenated bisphenols such as 4,4'-isopropylidenebis(2,6-dibromophenol), 4,4'-isopropylidenebis(2,6-dichlorophenol) and 4,4'-isopropylidenebis(2,3,5,6-tetrachlorophenol); and biscyclohexanols, which can be prepared by hydrogenating the corresponding bisphenols, such as 4,4'-isopropylidene-biscyclohexanol; 4,4'-oxybiscyclohexanol; 4,4'-thiobiscyclohexanol; and bis(4-hydroxycyclohexanol)methane.

Preferably, the polyether polyols are selected from the group consisting of polyoxyalkylene polyols, polyalkoxylated polyols, poly(oxytetramethylene)diols and mixtures thereof, and most preferably, polyoxyalkylene polyols having a number average molecular weight of equal to or greater than 1,000, ethoxylated Bisphenol A having approximately 30 ethoxy groups, poly(oxytetramethylene) diols having a number average molecular weight of 1000 and mixtures thereof.

Amide-containing polyols are known and typically are prepared from the reaction of diacids or lactones and low molecular weight polyols described herein with diamines or aminoalcohols as described hereinafter. For example, amide-containing polyols may be prepared by the reaction of neopentyl glycol, adipic acid and hexamethylenediamine. The amide-containing polyols may also be prepared through aminolysis by the reaction, for example, of carboxylates, carboxylic acids, or lactones with amino alcohols. Examples of suitable diamines and amino alcohols include hexamethylenediamines, ethylenediamines, phenylenediamine, monoethanolamine, diethanolamine, isophorone diamine and the like.

Polyhydric polyvinyl alcohols are known and can be prepared, for example, by the polymerization of vinyl acetate in the presence of suitable initiators followed by hydrolysis of at least a portion of the acetate moieties. In the hydrolysis process, hydroxyl groups are formed which are attached directly to the polymer backbone. In addition to homopolymers, copolymers of vinyl acetate and monomers such as vinyl chloride can be prepared and hydrolyzed in similar fashion to form polyhydric polyvinyl alcohol-polyvinyl chloride copolymers. Also included in this group are poly(vinylphenol) polymers and copolymers of poly (vinylphenols) which may be synthesized by vinyl polymerization of p-vinylphenol monomers.

Epoxy polyols are known and can be prepared, for example, by the reaction of glycidyl ethers of polyphenols such as the diglycidyl ether of 2,2-bis(4-hydroxyphenyl) propane, with polyphenols such as 2,2-bis(4-hydroxyphenyl)propane. Epoxy polyols of varying molecular weights and average hydroxyl functionality can be prepared depending upon the ratio of starting materials used.

Urethane polyols are known and can be prepared, for example, by reaction of a polyisocyanate with excess organic polyol to form a hydroxyl functional product. Examples of polyisocyanates useful in the preparation of urethane polyols include toluene-2,4-diisocyanate; toluene-2,6-diisocyanate; diphenylmethane-4,4'-diisocyanate; diphenyl methane-2,4'-diisocyanate; para-phenylene diisocyanate; biphenyl diisocyanate; 3,3'-dimethyl-4,4'-diphenylene diisocyanate; tetramethylene-1,4-diisocyanate; hexamethylene-1,6-diisocyanate; 2,2,4-trimethyl hexane-1,6-diisocyanate; lysine methyl ester diisocyanate; bis (isocyanato ethyl)fumarate; isophorone diisocyanate; ethylene diisocyanate; dodecane-1,12-diisocyanate; cyclobutane-1,3-diisocyanate; cyclohexane-1,3-diisocyanate; cyclohexane-1,4-diisocyanate; methyl cyclohexyl diisocyanate; dicyclohexylmethane diisocyanate; hexahydrotoluene-2,4-diisocyanate; hexahydrotoluene-2,6-diisocyanate; hexahydrophenylene-1,3-diisocyanate; hexahydrophenylene-1,4-diisocyanate; polymethylene polyphenol isocyanates perhydrodiphenylmethane-2,4'-diisocyanate; perhydrodiphenylmethane-4,4'-diisocyanate and mixtures thereof.

Examples of organic polyols useful in the preparation of urethane polyols include hydroxyl-terminated homopolymers of butadiene, the other polyols described herein, e.g., low molecular weight polyols, polyester polyols, polyether polyols, amide-containing polyols, polyacrylic polyols, polyhydric polyvinyl alcohols and mixtures thereof.

The polyacrylic polyols are known and can be prepared by free-radical addition polymerization techniques of monomers described hereinafter. Preferably said polyacrylic polyols have a weight average molecular weight of from 500 to 50,000 and a hydroxyl number of from 20 to 270. More preferably, the weight average molecular weight is from 1000 to 30,000 and the hydroxyl number is from 80 to 250. Most preferably, the average molecular weight is from 3,000 to 20,000 and the hydroxyl number is from 100 to 225.

Polyacrylic polyols include, but are not limited to, the known hydroxyl-functional addition polymers and copolymers of acrylic and methacrylic acids; their ester derivatives including, but not limited to, their hydroxyl-functional ester derivatives. Examples of hydroxyl-functional ethylenically unsaturated monomers to be used in the preparation of the hydroxyl-functional addition polymers include hydroxyethyl (meth)acrylate, i.e., hydroxyethyl acrylate and hydroxyethyl methacrylate, hydroxypropyl (meth)acrylate, hydroxybutyl (meth)acrylate, hydroxymethylethyl acrylate, hydroxymethylpropyl acrylate and mixtures thereof.

More preferably, the polyacrylic polyol is a copolymer of hydroxy-functional ethylenically unsaturated (meth)acrylic monomers and other ethylenically unsaturated monomers selected from the group consisting of vinyl aromatic monomers, e.g., styrene, α-methyl styrene, t-butyl styrene and vinyl toluene; vinyl aliphatic monomers such as ethylene, propylene and 1,3-butadiene; (meth)acrylamide; (meth)acrylonitrile; vinyl and vinylidene halides, e.g., vinyl chloride and vinylidene chloride; vinyl esters, e.g., vinyl acetate; alkyl esters of acrylic and methacrylic acids having from 1 to 17 carbon atoms in the alkyl group, including methyl (meth)acrylate, ethyl (meth)acrylate, butyl (meth) acrylate, cyclohexyl (meth)acrylate, 2-ethylhexyl (meth) acrylate, isobornyl (meth)acrylate and lauryl (meth)acrylate; epoxy-functional ethylenically unsaturated monomers such as glycidyl (meth)acrylate; carboxy-functional ethylenically unsaturated monomers such as acrylic and methacrylic acids and mixtures of such ethylenically unsaturated monomers.

The hydroxyl-functional ethylenically unsaturated (meth) acrylic monomer(s) may comprise up to 95 weight percent of the polyacrylic polyol copolymer. Preferably it comprises up to 70 weight percent, and more preferably, the hydroxyl-functional ethylenically unsaturated (meth)acrylic monomer (s) comprises up to 45 weight percent, e.g., 40 weight percent, of the total copolymer.

The polyacrylic polyols described herein can be prepared by free radical initiated addition polymerization of the monomer(s), and by organic solution polymerization techniques. The monomers are typically dissolved in an organic solvent or mixture of solvents including ketones such as methyl ethyl ketones, esters such as butyl acetate, the acetate of propylene glycol, and hexyl acetate, alcohols such as ethanol and butanol, ethers such as propylene glycol monopropyl ether and ethyl-3-ethoxypropionate, and aromatic solvents such as xylene and SOLVESSO 100, a mixture of high boiling hydrocarbon solvents available from Exxon Chemical Co. The solvent is first heated to reflux, usually 70 to 160° C., and the monomer or a mixture of monomers and free radical initiator is slowly added to the refluxing solvent, over a period of about 1 to 7 hours. Adding the monomers too quickly may cause poor conversion or a high and rapid exothermic reaction, which is a safety hazard. Suitable free radical initiators include t-amyl peroxyacetate, di-t-amyl peroxyacetate and 2,2'-azobis (2-methylbutanenitrile). The free radical initiator is typically present in the reaction mixture at from 1 to 10 percent, based on total weight of the monomers. The polymer prepared by the procedures described herein is non-gelled or ungelled and preferably has a weight average molecular weight of from 500 to 50,000 grams per mole.

The molecular weight of suitable hydroxyl-functional components for the preparation of compositions of the invention can vary within wide limits depending on the nature of the specific classes of polyols selected. Typically, the number average molecular weight of suitable polyols can range from 62 to 50,000, preferably from 1000 to 20,000, and the hydroxyl equivalent weight can range from 31 to 25,000, preferably 500 to 10,000. The molecular weights of the hydroxyl group-containing polymers are determined by gel permeation chromatography using a polystyrene standard.

The acrylic materials, i.e., polymers, of the functional group containing component may be prepared by the aforedescribed free radical polymerization methods disclosed in relation to polyacrylic polyols or by solution polymerization techniques in the presence of suitable catalysts. Such catalysts are organic peroxides or azo compounds, for example, benzoyl peroxide or N,N-azobis(isobutyronitrile). The polymerization may be carried out in an organic solution in which the monomers are soluble by techniques conventional in the art. Alternately, the acrylic polymer may be prepared by aqueous emulsion or dispersion polymerization techniques well known in the art.

The acrylic polymer typically has a weight average molecular weight of from about 500 to 50,000, preferably from about 1,000 to 30,000 as determined by gel permeation chromatography using a polystyrene standard, and an equivalent weight of less than 5000, preferably within the range of 140 to 2500, based on equivalents of reactive pendant or terminal hydroxyl, carbamate, urea, or combinations of such functional groups. The equivalent weight is a calculated value based on the relative amounts of the various ingredients used in making the acrylic material and is based on solids of the acrylic material.

Polyesters may also be used in the formulation of the functional component in the coating composition and may be prepared by the polyesterification of a polycarboxylic acid or anhydride thereof with polyols and/or an epoxide. Examples of suitable materials for preparing polyesters are described herein in relation to polyester polyols. Polyesters having hydroxyl-functional groups may be prepared by the aforedescribed methods for making polyester polyols.

Polyurethanes may also be used in the formulation of the functional component in the coating composition. Polyurethanes may be formed by reacting a polyisocyanate with a polyester having hydroxyl functionality and containing pendant hydroxyl groups. Examples of suitable polyisocyanates are aromatic and aliphatic polyisocyanates, with aliphatic being preferred because of better color and durability properties. Examples of suitable aromatic diisocyanates are diphenylmethane-4,4'-diisocyanate, 1,3-phenylene diisocyanate, 1,4-phenylene diisocyanate, and toluene diisocyanate. Examples of suitable aliphatic diisocyanates are straight chain aliphatic diisocyanates such as 1,4-tetramethylene diisocyanate and 1,6-hexamethylene diisocyanate. Also, cycloaliphatic diisocyanates can be employed and may be selected to impart hardness to the product. Examples include 1,4-cyclohexyl diisocyanate, isophorone diisocyanate, alpha,alpha-xylylene diisocyanate and 4,4'-methylene-bis-(cyclohexylisocyanate). Other polyisocyanates useful in preparing the polyurethane are included in the aforedescribed methods for making urethane polyols.

The polyester or polyurethane materials used to prepare the functional component typically have a number average molecular weights of about 300 to 3,000, preferably about 300 to 1,500 as determined by gel permeation chromatography using a polystyrene standard, and an equivalent weight of from about 140 to 2,500 based on equivalents of pendant hydroxyl functional groups. The equivalent weight is a calculated value based on the relative amounts of the various ingredients used in making the polyester or polyurethane and is based on solids of the material.

The aminoplast resin of the coating composition of the present invention is in the composition in amounts of at least 1 percent by weight, preferably, at least 2 percent by weight, and more preferably, at least 5 percent by weight. Typically, the aminoplast resin is present in amounts of not more than 30 percent by weight, preferably, not more than 20 percent by weight and most preferably, not more than 15 percent by weight in the coating composition. The amount of aminoplast resin in the coating composition may range between any combination of these values, inclusive of the recited values. Aminoplast resins are condensation products of amines or amides with aldehydes. Examples of suitable amine or amides are melamine, benzoguanamine, glycoluril, urea and similar compounds. Preferably, the aminoplast resin has at least two reactive groups, i.e., groups that are reactive with the hydroxyl groups.

Generally, the aldehyde employed is formaldehyde, although products can be made from other aldehydes such as acetaldehyde, crotonaldehyde, benzaldehyde and furfural. The condensation products contain methylol groups or similar alkylol groups depending on the particular aldehyde employed. These alkylol groups may be etherified by reaction with an alcohol. Various alcohols employed include monohydric alcohols containing from 1 to 6 carbon atoms such as methanol, ethanol, isopropanol, n-butanol, pentanol and hexanol. Preferably, alcohols containing from 1 to 4 carbon atoms are used.

Aminoplast resins are commercially available from American Cyanamid Co. under the trademark CYMEL and from Monsanto Chemical Co. under the trademark RESIMENE. The preferred aminoplast resin for use in the coating composition of the present invention is an alkylated melamine-formaldehyde condensate found in products such as CYMEL® 345, 350 and/or 370 resins. However, condensation products of other amines and amides can also be employed, for example, aldehyde condensates of triazines, diazines, triazoles, guanidines, guanimines and alkyl- and aryl-substituted derivatives of such compounds, including alkyl- and aryl-substituted melamines. Some examples of such compounds are N,N'-dimethyl urea, benzourea, dicyandiamide, formaguanamine, acetoguanamine, ammeline, 2-chloro-4,6-diamino-1,3,5-triazine, 6-methyl-2, 4-diamino, 1,3,5-traizine, 3,5-diaminotriazole, triaminopyrimidine,2-mercapto-4,6-diamino-pyrimidine, 3,4,6-tris(ethylamino)-1,3,5-triazine, tris (alkoxycarbonylamino) triazine and the like.

Typically, the amount of the functional group containing component and the aminoplast component in the coating compositions of the invention are selected to provide a ratio of equivalents of hydroxyl functional groups, to equivalents of reactive aminoplast groups, i.e., methylol and/or methylol ether groups, in the range of 0.5 to 2:1. This ratio is based on calculated equivalent weights and is sufficient to result in a crosslinked coating. The functional component and the aminoplast component in combination may be present in the coating composition in amounts of from 20 to 99.9, preferably from 60 to 95 percent, and more preferably from 70 to 90 percent by weight based on weight of total resin solids.

The coating composition of the invention may include a catalytic agent for accelerating the curing reaction between functional groups of the functional group containing component and the reactive groups of the aminoplast component. Examples of suitable catalysts are acidic materials and include phosphoric acid or substituted phosphoric acids such as alkyl acid phosphate and phenyl acid phosphate, sulfonic acids or substituted sulfonic acids such as para-toluene sulfonic acid, dodecylbenzine sulfonic acid and dinonylnaphthalene sulfonic acid. The amount of optional catalyst is a catalytic amount, i.e., an amount necessary to catalyze the polymerization of monomers. The catalyst may be present in an amount of from 0.5 to 5.0 percent by weight, preferably from 1 to 2 percent by weight, based on the total weight of resin solids. After adding a catalytic amount of catalyst, any manner of curing the polymerizable composition of the present invention that is appropriate for the specific composition and substrate may be used.

Solvents that may be present in the coating composition of the present invention are those that are necessary to dissolve the solid components. The minimum amount of solvent present in the coating composition is a solvating amount, i.e., an amount which is sufficient to solubilize the solid components in the coating composition. For example, the amount of solvent present may range from 10 to 80 weight percent based on the total weight of the coating composition.

Suitable solvents include, but are not limited to, the following: benzene, toluene, methyl ethyl ketone, methyl isobutyl ketone, acetone, ethanol, tetrahydrofurfuryl alcohol, propyl alcohol, propylene carbonate, N-methyl pyrrolidinone, N-vinyl pyrrolidinone, N-acetyl pyrrolidinone, N-hydroxymethyl pyrrolidinone, N-butyl pyrrolidinone, N-ethyl pyrrolidinone, N-(N-octyl) pyrrolidinone, N-(N-dodecyl) pyrrolidinone, 2-methoxyethyl ether, xylene, cyclohexane, 3-methyl cyclohexanone, ethyl acetate, butyl acetate, tetrahydrofuran, methanol, amyl propionate, methyl propionate, propylene glycol methyl ether, diethylene glycol monobutyl ether, dimethyl sulfoxide, dimethyl foramide, ethylene glycol, mono- and dialkyl ethers of ethylene glycol and their derivatives which are sold as CELLOSOLVE industrial solvents by Union Carbide, and mixtures of such solvents.

The photochromic aminoplast resin coating composition of the present invention may further comprise additional conventional ingredients which impart desired characteristics to the composition, or which are required for the process used to apply and cure the composition to the substrate or which enhance the cured coating made therefrom. Such additional ingredients comprise rheology control agents, leveling agents, e.g., surfactants, plasticizers such as benzoate esters, initiators, cure-inhibiting agents, free radical scavengers, polymer chain terminating reagents and adhesion promoting agents, such as trialkoxysilanes preferably having an alkoxy radical of 1 to 4 carbon atoms, including γ-glycidoxypropyltrimethoxysilane, γ-aminopropyltrimethoxysilane, 4-epoxycyclohexylethyltrimethoxysilane and aminoethyltrimethoxysilane.

Photochromic compounds that may be utilized in the aminoplast resin coating composition(s) of the present invention are organic photochromic compounds. Such compounds may be used individually or in combination with other complementary photochromic compounds. Organic photochromic compounds or substances containing the same used in the coating composition described herein have at least one activated absorption maxima within the range of between about 400 and 700 nanometers. Such substances may be incorporated, e.g., dissolved or dispersed, in the aminoplast resin composition used to prepare the photochromic aminoplast resin coating and color when activated to an appropriate hue.

More particularly, in one embodiment the organic photochromic component comprises:

(a) at least one photochromic organic compound having a visible lambda max of from 400 nanometers to 525 nanometers; and (b) at least one photochromic organic compound having a visible lambda max of from greater than 525 nanometers to 700 nanometers.

Examples of suitable photochromic compounds for use in the aminoplast resin coating composition of the present invention include benzopyrans, naphthopyrans, e.g., naphtho[1,2-b]pyrans and naphtho[2,1-b]pyrans, phenanthropyrans, quinopyrans, benzoxazines, naphthoxazines, spiro(indoline)pyridobenzoxazines and indeno-fused naphthopyrans such as those disclosed in U.S. Pat. No. 5,645,767. Specific examples include the novel naphthopyrans of U.S. Pat. No. 5,658,501 and the complementary organic photochromic substances disclosed in this patent from column 11, line 57 through column 13, line 36. Other photochromic substances contemplated for use herein are photochromic metal-dithizonates, e.g., mercury dithizonates which are described in, for example, U.S. Pat. No. 3,361,706; fulgides and fulgimides, e.g. the 3-furyl and 3-thienyl fulgides and fulgimides, which are described in U.S. Pat. No. 4,931,220 at column 20, line 5 through column 21, line 38, and mixtures of the aforementioned suitable photochromic substances.

The disclosures relating to such photochromic compounds in the aforedescribed patents are incorporated herein, in toto, by reference. The photochromic coatings of the present invention may contain one photochromic compound or a mixture of photochromic compounds, as desired. Mixtures of photochromic compounds may be used to attain certain activated colors such as a near neutral gray or brown. Further discussion of neutral colors and ways to describe such colors is found in U.S. Pat. No. 5,645,767, column 12, line 66 to column 13, line 19.

The amount of the photochromic substances described herein to be used in the coating or polymerizate of the present invention is an amount sufficient to produce a photochromic effect discernible to the naked eye upon activation. Generally such amount can be described as a photochromic amount.

The relative amounts of the aforesaid photochromic compounds used will vary and depend in part upon the relative intensities of the color of the activated species of such compounds, and the ultimate color desired. Generally, the amount of photochromic substance incorporated into the coating composition may range from 0.1 to 40 weight percent based on the weight of the solids in the coating composition. Preferably, the concentration of photochromic substances ranges from 1.0 to 30 weight percent, more preferably, from 3 to 20 weight percent, and most preferably, from 5 to 15 weight percent, e.g., from 7 to 14 weight percent.

The photochromic compound(s) described herein may be incorporated into the coating composition by dissolving or dispersing the photochromic substance within a component, e.g., the organic polyol, of the coating composition. The photochromic substance may be added directly to the coating composition or it may be dissolved in solvent before adding it to the component or to the formulated coating composition. Alternatively, the photochromic compounds may be incorporated into the cured coating or polymerizate by imbibition, permeation or other transfer methods, as is known by those skilled in the art.

Compatible (chemically and color-wise) tints, i.e., dyes, may be added to the coating composition, applied to the coated article or applied to the substrate prior to coating to achieve a more aesthetic result, for medical reasons, or for reasons of fashion. The particular dye selected will vary and depend on the aforesaid need and result to be achieved. In one embodiment, the dye may be selected to complement the color resulting from the activated photochromic substances, e.g., to achieve a more neutral color or absorb a particular wavelength of incident light. In another embodiment, the dye may be selected to provide a desired hue to the substrate and/or coated article when the photochromic substance is in an unactivated state.

Adjuvant materials may also be incorporated into the coating composition with the photochromic substances, prior to, simultaneously with or subsequent to application or incorporation of the photochromic substances in the coating composition or cured coating. For example, ultraviolet light absorbers may be admixed with photochromic substances before their addition to the coating composition or such absorbers may be superposed, e.g., superimposed, as a layer between the photochromic coating and the incident light. Further, stabilizers may be admixed with the photochromic substances prior to their addition to the coating composition to improve the fatigue resistance of the photochromic substances. Stabilizers, such as hindered amine light stabilizers (HALS), antioxidants, e.g., polyphenolic antioxidants, asymmetric diaryloxalamide (oxanilide) compounds and singlet oxygen quenchers, e.g., a nickel ion complex with an organic ligand, or mixtures of stabilizers are contemplated. They may be used alone or in combination. Such stabilizers are described in U.S. Pat. Nos. 4,720,356, 5,391,327 and 5,770,115 which patents are incorporated herein by reference.

The coating compositions of the present invention may be applied to substrates, of any type such as, for example paper, glass, ceramics, wood, masonry, textiles, metals and polymeric organic materials. Preferably, the substrate is a polymeric organic material, particularly, thermoset and thermoplastic polymeric organic materials, e.g., thermoplastic polycarbonate type polymers and copolymers and homopolymers or copolymers of a polyol(allyl carbonate) used as organic optical materials.

The amount of the coating composition applied to the substrate is an amount necessary to incorporate a sufficient quantity of the organic photochromic substance(s) to produce a coating that exhibits the required change in optical density (ΔOD) when the cured coating is exposed to UV radiation. The required change in optical density is that which, when tested at 85° F. (29.4° C.) produces a ΔOD of at least 0.15 after 30 seconds and at least 0.47 after 8 minutes. The bleach rate of the photochromic coating (the photochromic(s) in the coating) should be not more than 180 seconds using the photochromic response testing described in Part D of Example 16 herein. The applied coating may have a thickness of at least 5 microns, preferably, at least 10 microns, more preferably at least 20 microns, e.g., 25 microns. The applied coating will also usually have a thickness of not more than 200 microns, preferably, not more than 100 microns, and more preferably not more than 50 microns, e.g., 40 microns. The thickness of the coating may range between any combination of these values, inclusive of the recited values.

It is typical to treat the surface of the substrate to be coated prior to applying the coating composition of the present invention for the purposes of cleaning the surface and promoting adhesion. Effective treatment techniques for plastics, such as those prepared from CR-39® diethylene glycol bis(allyl carbonate) monomer or thermoplastic polycarbonate, e.g., a resin derived from bisphenol A and phosgene, include ultrasonic cleaning; washing with an aqueous mixture of organic solvent, e.g., a 50:50 mixture of isopropanol:water or ethanol:water; UV treatment; activated gas treatment, e.g., treatment with low temperature plasma or corona discharge, and chemical treatment such as hydroxylation, i.e., etching of the surface with an aqueous solution of alkali, e.g., sodium hydroxide or potassium hydroxide, that may also contain a fluorosurfactant. See U.S. Pat. No. 3,971,872, column 3, lines 13 to 25; U.S. Pat. No. 4,904,525, column 6, lines 10 to 48; and U.S. Pat. No. 5,104,692, column 13, lines 10 to 59, which describe surface treatments of polymeric organic materials.

The treatment used for cleaning glass surfaces will depend on the type of dirt present on the glass surface. Such treatments are known to those skilled in the art. For example, washing the glass with an aqueous solution that may contain a low foaming, easily rinsed detergent, followed by rinsing and drying with a lint-free cloth; and ultrasonic bath treatment in heated (about 50° C.) wash water, followed by rinsing and drying. Pre-cleaning with an alcohol-based cleaner or organic solvent prior to washing may be required to remove adhesives from labels or tapes.

In some cases, it may be necessary to apply a primer to the surface of the substrate before application of the coating composition of the present invention. The primer serves as a barrier coating to prevent interaction of the coating ingredients with the substrate and vice versa, and/or as an adhesive layer to adhere the coating composition to the substrate. Application of the primer may be by any of the methods used in coating technology such as, for example, spray coating, spin coating, spread coating, curtain coating, dip coating, casting or roll-coating.

The use of protective coatings, some of which may contain polymer-forming organosilanes, as primers to improve adhesion of subsequently applied coatings has been described. In particular, the use of non-tintable coatings is preferred. Examples of commercial coating products include SILVUE 124 and HI-GARD coatings, available from SDC Coatings, Inc. and PPG Industries, Inc., respectively. In addition, depending on the intended use of the coated article, it may be necessary to apply an appropriate protective coating(s), i.e., an abrasion resistant coating onto the exposed surface of the coating composition to prevent scratches from the effects of friction and abrasion. In some cases, the primer and protective coatings are interchangeable, i.e., the same coating may be used as the primer and the protective coating(s). Other coatings or surface treatments, e.g., a tintable coating, antireflective surface, etc., may also be applied to the cured coating of the present invention.

The coating composition of the present invention may be applied using the same methods described herein for applying the primer and the protective coating(s) or other methods known in the art can be used. Preferably, the coating composition is applied by spin coating, curtain coating, dip coating, spray coating methods, or by methods used in preparing overlays. Such methods for producing overlays are disclosed in U.S. Pat. No. 4,873,027, which patent is incorporated herein by reference.

Following application of the coating composition to the treated surface of the substrate, the coating is cured. Depending on the components selected for the coating composition of the present invention, the coating may be cured at temperatures ranging from 22° C. to 200° C. If heating is required to obtain a cured coating, temperatures of between 80° C. and a temperature above which the substrate is damaged due to heating, e.g., 80° C. to 200° C., are typically used. For example, certain organic polymeric materials may be heated up to 130° C. for a period of 1 to 16 hours in order to cure the coating without causing damage to the substrate. While a range of temperatures has been described for curing the coated substrate, it will be recognized by persons skilled in the art that temperatures other than those disclosed herein may be used. Additional methods for curing the photochromic aminoplast resin coating composition include irradiating the coating with infrared, ultraviolet, visible, microwave, or electron radiation. This may be followed by a heating step.

Preferably, the resulting cured coating meets commercially acceptable "cosmetic" standards for optical coatings. Examples of cosmetic defects of coated lens include an orange peel-like appearance, pits, spots, inclusions, cracks and crazing of the coating. Most preferably, the coatings prepared using the photochromic coating composition of the present invention are substantially free of cosmetic defects.

Examples of polymeric organic materials that may be substrates for the coating composition of the present invention are polymers, i.e., homopolymers and copolymers, of the monomers and mixtures of monomers disclosed in U.S. Pat. No. 5,658,501 from column 15, line 28 to column 16, line 17, which is incorporated herein by reference.

Examples of such monomers and polymers include: polyol(allyl carbonate)monomers, e.g., diethylene glycol bis(allyl carbonate), which monomer is sold under the trademark CR-39; polyol(meth)acryloyl terminated carbonate monomer; diethylene glycol dimethacrylate monomers; ethoxylated phenol methacrylate monomers; diisopropenyl benzene monomers; ethoxylated trimethylol propane triacrylate monomers; ethylene glycol bismethacrylate monomers; poly(ethylene glycol)bis methacrylate monomers; urethane acrylate monomers; poly(ethoxylated bisphenol A dimethacrylate); poly(vinyl acetate); poly(vinyl alcohol); poly(vinyl chloride); poly(vinylidene chloride); polyurethanes, polythiourethanes, thermoplastic polycarbonates, such as the carbonate-linked resin derived from bisphenol A and phosgene, which is sold under the trademark LEXAN; polyesters, such as the material sold under the trademark MYLAR; poly(ethylene terephthalate); polyvinyl butyral; and poly(methyl methacrylate), such as the material sold under the trademark PLEXIGLAS and mixtures thereof.

More particularly contemplated, is the use of the combination of the photochromic aminoplast resin coating composition of the present invention with polymeric organic materials such as optically clear polymerizates, i.e., materials suitable for optical applications, such as optical elements, e.g., plano and vision correcting ophthalmic lenses, windows, clear polymeric films, automotive transparencies, e.g., windshields, aircraft transparencies, plastic sheeting, etc. Such optically clear polymerizates may have a refractive index that may range from 1.48 to 2.00, e.g., from 1.495 to 1.75 or from 1.50 to 1.66. Specifically contemplated are optical elements made of thermoplastic polycarbonates. Application of the photochromic aminoplast resin coating composition of the present invention to a polymeric film in the form of an "applique" may be accomplished using the methods describe in column 17, line 28 to column 18, line 57 of U.S. Pat. No. 5,198,267.

Most particularly contemplated, is the use of the combination of the photochromic aminoplast resin coating composition of the present invention with optical elements to produce photochromic optical articles. Such articles are prepared by sequentially applying to the optical element a primer, the photochromic aminoplast resin composition of the present invention and appropriate protective coating(s). The resulting cured coating preferably meets commercially acceptable "cosmetic" standards for optical coatings, and most preferably, is substantially free of cosmetic defects.

In another embodiment of the invention, the photochromic coating composition may be used to form polymerizates, e.g., shaped solid optically clear polymerizates, as defined herein with respect to polymeric organic materials. Polymerization of the coating composition may be accomplished by adding to the polymerizable composition a catalyst and curing in a manner appropriate for the specific composition and desired shape. The resulting polymerizate demonstrates the same Fischer microhardness and photochromic performance properties of the cured coating, is substantially free of cosmetic defects and may have a thickness of 0.5 millimeters or more.

In one contemplated embodiment, a glass two-part lens mold is filled with desolvated photochromic coating composition, i.e., the polymerizable composition containing a minimal amount of solvent, which may additionally contain a catalytic amount of phosphoric acid. The glass mold is sealed and placed in an oven. A thermal polymerization cycle is initiated which may range from 10 to 20 hours duration at about 45 to 110° C. Afterwards, the mold is opened and the resulting lens, i.e., polymerizate, is removed. The polymer lens thus produced is then annealed for a period and at a temperature sufficient to eliminate residual stresses in the lens. The temperature is generally between 100 and 110° C. and annealing is carried out for 1 to 5 hours. If the photochromic material was not included in the polymerizable composition, it may be incorporated into the polymerizate by imbibition, permeation or other transfer methods known to those skilled in the art.

In a further contemplated embodiment, a semi-finished single vision (SFSV) lens having an adherent layer of the photochromic crosslinkable composition of the present invention may be prepared by an overmolding process. Typically, a predetermined volume of the photochromic polymerizable composition is dispensed into a volume defined by a spherical negative glass mold, which approximately matches the front surface curve and the outer diameter of a SFSV lens. The glass mold is fitted with a circular polyvinyl chloride gasket that extends approximately 0.2 millimeters above the mold and has an inside diameter approximately 4 millimeters less than outside diameter of the glass mold. After the monomer is dispensed, the SFSV lens is carefully placed on the dispensed polymerizable composition which spreads to fill the defined volume. A circular glass plate having an outside diameter equal to or greater than that of the lens is placed onto the rear surface of the lens. A spring clamp is positioned so that one side of the clamp is on the front surface of the negative mold and other side of the clamp is on the back surface of the glass plate. The resulting assembly is sealed by taping the circumference of the plate-lens-gasket-mold using polyurethane tape. The assembly is preheated in an air oven from 30 to 95° C. for 60 minutes and subsequently, the temperature is increased from 95° C. to 125° C. and decreased to 82° C. over a 3 hour interval. The assembly is separated by inserting a wedge beneath the gasket between the lens and mold. The lens now has an adherent layer of from 180 to 200 microns. If the photochromic material was not included in the polymerizable composition, it may be incorporated into the adherent layer by imbibition, permeation or other transfer methods known to those skilled in the art.

The present invention is more particularly described in the following examples, which are intended as illustrative only, since numerous modifications and variations therein will be apparent to those skilled in the art.

Composition A

The following materials were added in the order and manner described to a suitable reaction vessel equipped with an agitator, a reflux column, an addition funnel, nitrogen inlet, an internal temperature probe connected to an external electronic controller and a heating mantle:

| Material | Weight (grams) |
|---|---|
| Charge-1 | |
| SOLVESSO 100 solvent[1] | 120 |
| Xylene | 120 |
| Isobutanol | 48 |
| Charge-2 | |
| Hydroxypropyl acrylate | 448 |
| Butyl acrylate | 212.8 |
| Butyl methacrylate | 207.2 |
| Styrene | 224.0 |
| Acrylic acid | 22.4 |
| Methyl methacrylate | 5.6 |
| Tertiary dodecyl mercaptan | 11.2 |
| Charge-3 | |
| Xylene | 96 |
| SOLVESSO 100 solvent | 72 |
| VAZO-67 ® initiator[2] | 56 |
| Charge-4 | |
| SOLVESSO 100 solvent | 12 |
| VAZO-67 ® initiator | 4.5 |
| Charge-5 | |
| SOLVESSO 100 solvent | 12 |
| VAZO-67 ® initiator | 4.5 |

[1]Aromatic solvent available from Exxon.
[2]2,2'-azobis-(2-methylbutyronitrile) available from E. I. duPont de Nemours and Company.

Charge-1 was added to the reaction vessel; nitrogen was introduced into the vessel, and with the agitator running heat was applied to the reaction vessel to maintain a temperature at which reflux of the solvent occurred. After reaching the reflux temperature, Charges-2 and -3 were added simultaneously to the reaction vessel in a continuous manner over a period of 2 hours. Subsequently, Charge-4 was added and the reaction mixture was held for 1 hour at the reflux temperature. Charge-5 was then added and the reaction mixture was held an additional 1.5 hours at the reflux temperature. The contents of the reaction vessel were then cooled and transferred to a suitable container. The resulting polymer solution had a calculated total solids content, based on total solution weight, of about 70.7 percent. The polymer had a weight average molecular weight, as measured by gel permeation chromatography using polystyrene as a standard, of about 9,000 and a hydroxyl value of about 170, based on polymer solids.

Composition B

The following materials were added in the order described to a suitable vessel.

| Material | Weight (grams) |
|---|---|
| Photochromic 1[3] | 5.229 |
| TINUVIN ® 144 UV stabilizer[4] | 1.268 |
| BAYSILONE ® PL paint additive[5] | 0.315 |
| pTSA[6] | 0.252 |
| NMP[7] | 32.55 |

[3]A naphtho[1,2-b]pyran that exhibits a blue color when irradiated with ultraviolet light.
[4]Hindered amine ultraviolet light stabilizer available from CIBA-GEIGY CORPORATION.
[5]Phenyl methyl polysiloxane available from Bayer Corporation.
[6]para-Toluene sulfonic acid.
[7]N-methyl pyrrolidone solvent of 99 percent purity.

After all of the materials were added to the vessel, the contents were heated for about 15 minutes at 60° C.

Composition C

The following materials were added in the order described to a suitable vessel.

| Material | Weight (grams) |
|---|---|
| Photochromic 1 | 5.90 |
| TINUVIN ® 144 UV stabilizer | 1.48 |

-continued

| Material | Weight (grams) |
| --- | --- |
| NMP | 31.69 |
| CYMEL ® 370 resin[8] | 18.2 |

[8]Described as a partially alkylated melamine formaldehyde resin available from CYTEC Industries Inc.

After all of the materials were added to the vessel, the contents were heated for about 15 minutes at 60° C.

Composition D

The following materials were added in the order described to a suitable vessel.

| Material | Weight (grams) |
| --- | --- |
| Photochromic 1 | 5.83 |
| TINUVIN ® 144 UV stabilizer | 1.46 |
| NMP | 29.48 |
| CYMEL ® 345 resin[9] | 19.76 |

[9]Described as a high imino, methylated melamine formaldehyde resin available from CYTEC Industries, Inc.

After all of the materials were added to the vessel, the contents were heated for about 15 minutes at 60° C.

Composition E

The following materials were added in the order described to a suitable vessel.

| Material | Weight (grams) |
| --- | --- |
| Photochromic 1 | 7.02 |
| TINUVIN ® 144 UV stabilizer | 1.75 |
| NMP | 39.68 |
| CYMEL ® 350 resin[10] | 19.63 |

[10]Described as a highly methylated, monomeric melamine formaldehyde resin available from Cytec Industries, Inc.

After all of the materials were added to the vessel, the contents were heated for about 15 minutes at 60° C.

EXAMPLE 1

The following materials were added in the order described to a suitable vessel.

| Material | Weight (grams) |
| --- | --- |
| Composition A | 4.86 |
| CYMEL ® 350 resin | 1.51 |
| Composition B | 3.77 |

After all of the materials were added to the vessel, the contents were mixed at 2000 Rpm for about 2 minutes, if necessary, to obtain a clear solution.

EXAMPLE 2

The procedure of Example 1 was followed except that 4.62 grams of Composition A was used and 0.17 grams of polypropylene glycol having a number average molecular weight of 2,200 was added. The same amounts of the other materials in the composition of Example 1 were used.

EXAMPLE 3

The procedure for Example 2 was followed except that 4.37 grams of Composition A and 0.34 grams of polypropylene glycol were used.

EXAMPLE 4

The procedure for Example 2 was followed except that 4.13 grams of Composition A and 0.51 grams of polypropylene glycol were used.

EXAMPLE 5

Step 1

The following materials were added in the order described to a suitable vessel equipped with an agitator.

| Material | Weight (grams) |
| --- | --- |
| Photochromic 1 | 5.83 |
| TINUVIN ® 144 UV stabilizer | 1.46 |
| BAYSILONE ® PL paint additive | 0.05 |
| Phosphoric Acid | 0.53 |
| NMP | 29.48 |
| CYMEL ® 345 Resin | 19.70 |

After all of the materials were added to the vessel, the contents were heated for about 15 minutes at 60° C.

Step 2

The following materials were added in the order described to a suitable vessel equipped with an agitator.

| Material | Weight (grams) |
| --- | --- |
| Composition A | 3.65 |
| Product of Step 1 | 4.57 |
| pTHF[11] | 0.28 |

[11]Poly(oxytetramethylene)diol having a number average molecular weight of 1000 which is available from Great Lakes Chemical Corporation.

After all of the materials were added to the vessel, the contents were mixed at 2000 rpm for about 2 minutes, if necessary, to obtain a clear solution.

EXAMPLE 6

The procedure of Example 5 was followed except that in Step 2, 3.24 grams of Composition A and 0.57 grams of pTHF were used. The same amounts of the other materials in the composition of Example 5 were used.

EXAMPLE 7

The procedure of Example 5 was followed except that in Step 2, 2.84 grams of Composition A and 0.85 grams of pTHF were used.

EXAMPLE 8

The procedure of Example 5 was followed except that in Step 2, 2.43 grams of Composition A and 1.14 grams of pTHF were used.

EXAMPLE 9

Step 1

The following materials were added in the order described to a suitable vessel equipped with an agitator.

| Material | Weight (grams) |
|---|---|
| Photochromic 1 | 5.90 |
| TINUVIN 144 UV stabilizer | 1.48 |
| BAYSILONE PL paint additive | 0.05 |
| Phosphoric Acid | 0.53 |
| NMP | 31.69 |
| CYMEL ® 370 resin | 18.2 |

After all of the materials were added to the vessel, the contents were heated for about 15 minutes at 60° C.

Step 2

The following materials were added in the order described to a suitable vessel.

| Material | Weight (grams) |
|---|---|
| Composition A | 3.70 |
| pTHF | 0.29 |
| Product of Step 1 | 4.45 |

After all of the materials were added to the vessel, the contents were mixed at 5000 rpm for about 2 minutes, if necessary, to obtain a clear solution.

EXAMPLE 10

The procedure of Example 9 was followed except that in Step 2, 3.29 grams of Composition A and 0.58 grams of pTHF were used.

EXAMPLE 11

The procedure of Example 9 was followed except that in Step 2, 2.88 grams of Composition A and 0.86 grams of pTHF were used.

EXAMPLE 12

The following materials were added in the order described to a suitable vessel.

| Material | Weight (grams) |
|---|---|
| Composition C | 4.41 |
| Composition A | 3.70 |
| pTHF | 0.29 |

After all of the materials were added to the vessel, the contents were mixed at 5000 rpm for about 2 minutes, if necessary, to obtain a clear solution.

EXAMPLE 13

The procedure of Example 12 was followed except that 3.29 grams of Composition A and 0.58 gram of pTHF were used.

EXAMPLE 14

The procedure of Example 12 was followed except that 4.35 grams of Composition D was used in place of Composition C and 3.65 grams of Composition A and 0.28 gram of pTHF were used.

EXAMPLE 15

The procedure of Example 12 was followed except that 5.24 grams of Composition E was used in place of Composition C and 4.86 grams of Composition A were used. pTHF was not used.

Comparative Example 1

The procedure for Example 2 was followed except that 3.89 grams of Composition A and 0.68 grams of polypropylene glycol were used.

Comparative Example 2

The procedure of Example 5 was followed except that in Step 2, 4.05 grams of Composition A was used and pTHF was not added.

Comparative Example 3

The procedure of Example 5 was followed except that in Step 2, 2.03 grams of Composition A and 1.42 grams of pTHF were used.

Comparative Example 4

The procedure of Example 9 was followed except that in Step 2, 4.11 grams of Composition A was used and pTHF was not added.

Comparative Example 5

The procedure of Example 9 was followed except that in Step 2, 2.47 grams of Composition A and 1.15 grams of pTHF were used.

Comparative Examples 6–10

The procedures disclosed in Japanese Patent Application No. 61-268788 for the preparation of Application Examples (AE) 1, 2, 3, 6 and 7 were followed to produce Comparative Examples 6, 7, 8, 9 and 10, with the exception that spironaphthoxazine was replaced with the amount of Photochromic 1 used in the Examples herein and ethyl cellosolve 400 was replaced with N-methylpyrrolidone (NMP). AE 4 and 5 were not duplicated since the same prepolymer and polyol weights were used in AE 2 of JP 61-268788. The differences between AE 2 and AE 4 and 5 were that AE 4 contained 4 times the amount of photochromic in AE 2 and AE 5 used 2 parts of 1N hydrochloric acid as the cure accelerator in place of 0.5 parts $NH_4SCN$. The specific procedures used to prepare Comparative Examples 6–10 are listed hereinafter.

Part A

The following materials were added in the order and manner described to a suitable reaction vessel equipped with a magnetic stirring apparatus, a fractional distillation column, a condenser, a distillation receiving vessel, a nitrogen inlet, a thermometer and a heating mantle:

| Material | Weight (grams) |
|---|---|
| CYMEL ® 350 RESIN | 293.0 |
| 1,4-butanediol | 195.0 |
| phosphoric acid | 0.1 mL |

Charge 1 was added to the reaction vessel; an $N_2$ blanket was applied and the magnetic spinner was turned on. Heat was then applied to the reaction vessel; at 130° C. the $N_2$ blanket was converted to a $N_2$ sparge and the reaction mixture was held at this temperature for approximately 4 hours to produce 50 grams of distillate.

Part B

Butyl acrylate, 100 grams, 2-hydroxyethylmethacrylate, 25 grams, and 1.3 grams of azoisobutylnitrile (AIBN) were added to a reaction flask containing 600 grams of ethyl alcohol. The reaction mixture was heated to reflux, approximately 70° C., and was held at this temperature for 8 hours. The resulting polymer product had a calculated total solids content, based on total solution weight, of 17.38%. The polymer had a hydroxyl value of about 86.3, based on polymer solids. The polymer was concentrated to 64.5% solids, based on total solution weight, by rotary evaporation to reduce the level of ethyl alcohol in which Photochromic No. 1 was minimally soluble.

Part C

Methyl methacrylate, 10 grams, 2-hydroxyethylmethacrylate, 46.5 grams, and 1.3 grams of azoisobutylnitrile (AIBN) were added to a reaction flask containing 600 grams of ethyl alcohol. The reaction mixture was heated to reflux, approximately 70° C., and was held at this temperature for 8 hours. The resulting polymer product had a calculated total solids content, based on total solution weight, of 8.78%. The polymer had a hydroxyl value of about 397.8, based on polymer solids. The polymer was concentrated to 37.8% solids, based on total solution weight, by rotary evaporation to reduce the level of ethyl alcohol in which Photochromic No. 1 was minimally soluble.

Part D

The materials listed below in grams (g) were added to a suitable vessel, mixed at 5000 rpm for about 2 minutes, if necessary, to obtain a clear solution.

| Sample Number | Product of Part A (g) | Product of Part B (g) | Product of Part C (g) | $NH_4SCN$ (g) | PC No. 1 (g) | NMP (g) |
|---|---|---|---|---|---|---|
| CE 6 | 4.0 | 8.53 | | 0.05 | 1.03 | 4.54 |
| CE 7 | 6.0 | 6.2 | | 0.05 | 1.03 | 6.5 |
| CE 8 | 8.5 | 2.3 | | 0.05 | 1.03 | 6.9 |
| CE 9 | 6.0 | | 10.6 | 0.05 | 1.03 | 2.1 |
| CE 10 | 8.5 | | 3.97 | 0.05 | 1.03 | 6.2 |

Comparative Example 11

The procedure of Example 12 was followed except that 4.11 grams of Composition A and 0 gram of pTHF were used.

Comparative Example 12

The procedure of Example 12 was followed except that 2.88 grams of Composition A and 0.86 gram of pTHF were used.

Comparative Example 13

The procedure of Example 14 was followed except that 4.05 grams of Composition A and 0 gram of pTHF were used.

Comparative Example 14

The procedure of Example 14 was followed except that 3.24 grams of Composition A and 0.57 gram of pTHF were used.

Comparative Example 15

The procedure of Example 15 was followed except that 4.37 grams of Composition A and 0.34 gram of pTHF were used.

EXAMPLE 16

Part A

The solutions prepared in Examples 1–15 and Comparative Examples 1–15 were applied via a spincoating method to lens blanks made of CR-39® monomer. Prior to application of the coating, each lens blank was washed with detergent, rinsed with water, immersed for 3 minutes in an aqueous potassium hydroxide solution having a normality of about 2.4 which was maintained at about 50° C. and then rinsed twice with deionized water. The immersion and subsequent rinsing steps were conducted in a Bramson Ultrasonic Model 5200 Sonnicater. The solutions were dispensed onto each lens which was spinning at 2000 rpm. The lenses coated with solutions of the Examples and Comparative Examples were cured for 40 minutes in a convection oven maintained at 140° C.

A duplicate lens for each of Comparative Examples 6–10 was also cured for 3 hours at 140° C. as described in JP 61-268788. The results for tests performed in the subsequent Parts on the lenses cured for 3 hours were comparable to the results obtained on the lenses cured for 40 minutes and are not included in the Tables.

Part B

The photochromic coated test samples prepared in Part A were subjected to microhardness ($F_h$) testing using a Fischerscope HCV, Model H-100 available from Fischer Technology, Inc. The microhardness, measured in Newtons (N) per $mm^2$, of the coated test samples was determined by taking 3 measurements at a depth of 2 microns in the center area of the test sample prepared for each Example and Comparative Example under the conditions of a 100 milliNewton load, 30 load steps and 0.5 second pauses between load steps when possible. Prior to testing, each lens was stored in an enclosed chamber having a humidity of not more than 50 percent, e.g., 30 percent, for at least 12 hours. The test results are listed in Table 1.

All of the lenses coated with the solutions of Comparative Examples 6–9 demonstrated cosmetic defects. The lenses coated with Comparative Examples 6, 7 and 8 were hazy in appearance indicating a phase separation in the coating formulation. The lenses of Comparative Example 9 had a precipitate which is also indicative of product instability.

Part C

The photochromic coated test lenses from Part B were placed in a Siemens PE-1000 AC Plasma unit. The lenses were treated with oxygen plasma under the following conditions: power was set to 100 Watts; gas pressure was 38 pascals; a gas flowrate of 100 mL/minute was used; and the processing time was 60 seconds.

The plasma treated lenses were coated with HiGard® 1030 coating solution via a spincoating method. Approximately 4 mL of HiGard® 1030 coating solution was dispensed onto each lens which was spinning at 1100 revolutions per minute (rpm) for 13 seconds. Afterwards, the lenses were heated in a 60° C. oven for 20 minutes and then in a 120° C. oven for 3 hours.

Part D

The photochromic coated test samples prepared in Part C were tested for photochromic response on an optical bench in the 85° F. Photochromic Performance Test described hereinafter. Prior to testing on the optical bench, the photochromic test samples were exposed to 365 nanometer ultraviolet light for about 20 minutes to activate the photochromic compounds and then placed in a 75° C. oven for about 20 minutes to bleach (inactivate) the photochromic compounds. The coated test samples were then cooled to room temperature, exposed to fluorescent room lighting for at least 2 hours and then kept covered for at least 2 hours prior to testing on an optical bench. The bench was fitted with a 300 watt Xenon arc lamp, a remote controlled shutter, a Schott 3 mm KG-2 band-pass filter, which removes short wavelength radiation, neutral density filter(s), a quartz cell sample holder for maintaining sample temperature in which the test sample to be tested was inserted.

The power output of the optical bench, i.e., the dosage of light that the test sample would be exposed to, was adjusted to 0.67 milliwatts per square centimeter ($mW/cm^2$) using a GRASEBY Optronics Model S-371 portable photometer (Serial #21536) with a UV-A detector (Serial # 22411). The UV-A detector was placed into the sample holder and the light output was measured. Adjustments to the power output were made by increasing or decreasing the lamp wattage or by adding or removing neutral density filters in the light path.

A monitoring, collimated beam of light from a tungsten lamp was passed through the sample at 30° normal to the surface of the lens. After passing through the lens, the light from the tungsten lamp was directed through a 570 nanometer (nm) filter attached to a detector. The 570 nm filter passes wavelengths characteristic of the photochromic compound used in the examples. The output signals from the detector were processed by a radiometer. The control of the test conditions and acquisition of data was handled by the Labtech Notebook Pro software and the recommended I/O board.

Change in optical density (ΔOD) from the bleached state to the darkened state was determined by establishing the initial transmittance, opening the shutter from the Xenon lamp to provide ultraviolet radiation to change the test sample from the bleached state to an activated (i.e., darkened) state at selected intervals of time, measuring the transmittance in the activated state, and calculating the change in optical density according to the formula: $\Delta OD = \log(\%Tb/\%Ta)$, where %Tb is the percent transmittance in the bleached state, %Ta is the percent transmittance in the activated state and the logarithm is to the base 10.

The ΔOD was measured using a 570 nanometer filter after the first thirty (30) seconds of UV exposure and then after eight (8) minutes with the optical bench maintained at a temperature of 85° F. (29.4° C.) . The Bleach Rate (T ½) is the time interval in seconds for the ΔOD of the activated form of the photochromic compound in the coated test samples to reach one half the highest ΔOD at (85° F., 29.4° C.) after removal of the source of activating light. Results for the photochromic coated test samples for each Example are listed in Table 2.

TABLE 1

| Example No. | Fischer Microhardness Newtons/mm$^2$ |
|---|---|
| 1 | 138 |
| 2 | 114 |
| 3 | 78 |
| 4 | 62 |
| 5 | 174 |
| 6 | 119 |
| 7 | 77 |
| 8 | 57 |
| 9 | 159 |
| 10 | 89 |
| 11 | 47 |
| 12 | 120 |
| 13 | 48 |
| 14 | 102 |
| 15 | 109 |
| CE1 | 36 |
| CE2 | 206 |
| CE3 | 27 |
| CE4 | 192 |
| CE5 | 27 |
| CE6 | * |
| CE7 | 71 |
| CE8 | 130 |
| CE9 | ** |
| CE10 | 187 |
| CE11 | 174 |
| CE12 | 20 |
| CE13 | 197 |
| CE14 | 35 |
| CE15 | 18 |

*Fischer microhardness not determined because the coating was too tacky.
**Fischer microhardness not determined because the coating contained precipitates that created an irregular surface.

TABLE 2

| Example No. | ΔOD @ 85° F. After 30 sec. | ΔOD @ 85° F. After 8 min. | T ½ seconds |
|---|---|---|---|
| 1 | 0.17 | 0.74 | 137 |
| 2 | 0.30 | 0.75 | 75 |
| 3 | 0.38 | 0.74 | 57 |
| 4 | 0.39 | 0.73 | 50 |
| 5 | 0.18 | 0.47 | 104 |
| 6 | 0.31 | 0.57 | 46 |
| 7 | 0.39 | 0.58 | 32 |
| 8 | 0.41 | 0.58 | 28 |
| 9 | 0.23 | 0.55 | 75 |
| 10 | 0.37 | 0.60 | 39 |
| 11 | 0.43 | 0.61 | 27 |
| 12 | 0.34 | 0.68 | 55 |
| 13 | 0.44 | 0.65 | 32 |
| 14 | 0.22 | 0.58 | 94 |
| 15 | 0.36 | 1.15 | 161 |
| CE1 | 0.46 | 0.74 | 40 |
| CE2 | 0.07 | 0.32 | 370 |
| CE3 | 0.46 | 0.60 | 22 |
| CE4 | 0.09 | 0.39 | 306 |
| CE5 | 0.47 | 0.61 | 23 |
| CE6 | 0.44 | 0.56 | 19 |
| CE7 | 0.29 | 0.46 | 35 |
| CE8 | 0.14 | 0.33 | 138 |
| CE9 | 0.05 | 0.26 | >500 |
| CE10 | 0.04 | 0.19 | >500 |
| CE11 | 0.14 | 0.63 | 193 |
| CE12 | 0.48 | 0.86 | 45 |
| CE13 | 0.10 | 0.45 | 414 |

TABLE 2-continued

| Example No. | ΔOD @ 85° F. After 30 sec. | ΔOD @ 85° F. After 8 min. | T ½ seconds |
|---|---|---|---|
| CE14 | 0.35 | 0.63 | 43 |
| CE15 | 0.70 | 0.99 | 62 |

The results of Table 1 and 2 show that the lenses coated with the solutions of Examples 1 through 15 had the following properties: microhardness results that were within the desired range from 45 to 180 Newtons/mm$^2$; a ΔOD of at least 0.15 after 30 seconds and at least 0.47 after 8 minutes; and a fade rate of not more than 180 seconds, all tested at 85° F. (29.4° C.). All of the lenses coated with the solutions of the Comparative Examples had a result for at least one of the aforementioned properties that was outside of the desired range or demonstrated cosmetic defects, e.g., Comparative Examples 6–9 as reported in Part B of this example.

Although the present invention has been described with reference to specific details of certain embodiments thereof, it is not intended that such details should be regarded as limitations upon the scope of the invention except insofar as they are included in the accompanying claims.

We claim:

1. An article comprising, in combination, a substrate and a cured photochromic aminoplast resin coating on at least one surface of said substrate, said coating being prepared by combining components comprising:

(a) component comprising molecules having at least 2 hydroxyl groups per molecule;

(b) aminoplast component comprising molecules having at least two reactive groups per molecule; and (c) a photochromic amount of photochromic component (s);

provided that said components are combined without reacting said components before combining, said cured coating being substantially free of cosmetic defects, said components being used in such proportions to produce a photochromic aminoplast resin coating having a Fischer microhardness of from at least 45 to not more than 180 Newtons per mm$^2$, as measured with a Fischerscope® H-100 using a 100 milliNewton load, 30 load steps and 0.5 second pauses and exhibiting a ΔOD of at least 0.15 after 30 seconds and at least 0.47 after 8 minutes, and a bleach rate of not more than 180 seconds—all as measured in the 85° F. Photochromic Performance Test.

2. The article of claim 1 wherein the cured coating exhibits a Fischer microhardness of from at least 55 to not more than 160 Newtons per mm$^2$, a ΔOD of at least 0.16 after 30 seconds and at least 0.50 after 8 minutes, and a bleach rate of not more than 140 seconds.

3. The article of claim 1 wherein the cured coating exhibits a Fischer microhardness of from at least 60 to not more than 150 Newtons per mm$^2$, a ΔOD of at least 0.17 after 30 seconds and at least 0.55 after 8 minutes, and a bleach rate of not more than 100 seconds.

4. The article of claim 1 wherein the photochromic aminoplast resin coating further comprises a catalytic amount of catalyst for accelerating the curing reaction between the hydroxyl groups of (a)(i) and the aminoplast reactive groups of (a)(ii).

5. The article of claim 4 wherein the catalyst is selected from phosphoric acid, substituted phosphoric acid, sulfonic acid, substituted sulfonic acid or mixtures of such acids.

6. The article of claim 1 wherein the reactive groups of the aminoplast resin are selected from methylol, methylol ether groups, or combinations thereof.

7. The article of claim 1 wherein the hydroxyl component (a)(i) has a number average molecular weight of from 62 to 50,000.

8. The article of claim 7 wherein the hydroxyl component is selected from polyacrylic polyols, polyester polyols, polyether polyols or mixtures thereof.

9. The article of claim 8 wherein the hydroxyl component is selected from polyacrylic polyols, polyether polyols or mixtures thereof.

10. The article of claim 8 wherein the polyacrylic polyol is a co-polymer of ethylenically unsaturated monomer(s) having at least two hydroxyl groups and at least one polymerizable ethylenically unsaturated monomer which is free of hydroxyl groups.

11. The article of claim 1 wherein the aminoplast resin is a condensate of melamine with formaldehyde and optionally an alcohol containing from 1 to 6 carbon atoms.

12. The article of claim 11 wherein the aminoplast component is a condensation product of melamine with formaldehyde and an alcohol containing from 1 to 4 carbon atoms.

13. The article of claim 1 wherein the photochromic component(s) comprises:

(a) at least one photochromic compound having a visible lambda max of from 400 nanometers to 525 nanometers; and (b) at least one photochromic compound having a visible lambda max of from greater than 525 nanometers to 700 nanometers.

14. The article of claim 13 wherein the photochromic compound(s) are benzopyrans, naphthopyrans, phenanthropyrans, quinopyrans, indeno-fused naphthopyrans, benzoxazines, naphthoxazines, spiro (indoline)pyridobenzoxazines, metal-dithizonates, fulgides, fulgimides or mixtures thereof.

15. The article of claim 1 wherein the photochromic aminoplast resin coating has a thickness of from 5 to 200 microns.

16. The article of claim 15 wherein the photochromic aminoplast resin coating has a thickness of from 10 to 40 microns.

17. The article of claim 1 wherein said substrate is paper, glass, ceramic, wood, masonry, textile, metal or polymeric organic materials.

18. The article of claim 17 wherein the polymeric organic material is a solid transparent polymer selected from the group consisting of poly(methyl methacrylate), poly (ethylene glycol bismethacrylate), poly(ethoxylated bisphenol A dimethacrylate), thermoplastic polycarbonate, poly (vinyl acetate), polyvinylbutyral, polyurethane, polythiourethanes, and polymers of members of the group consisting of diethylene glycol bis(allyl carbonate) monomers, diethylene glycol dimethacrylate monomers, ethoxylated phenol methacrylate monomers, diisopropenyl benzene monomers, ethoxylated trimethylol propane triacrylate monomers and mixtures thereof.

19. The article of claim 18 wherein said substrate is an optical element.

20. The article of claim 19 herein said optical element is a lens.

21. The article of claim 20 wherein the refractive index of said lens is from 1.48 to 2.00.

22. A photochromic article comprising the polymerizate of a polymerizable composition being prepared by combining components comprising:

(a) component comprising molecules having at least 2 hydroxyl groups per molecule;

(b) aminoplast component comprising molecules having at least two reactive groups per molecule; and (c) a photochromic amount of photochromic component (s);

provided that said components are combined without reacting said components before combining, said polymerizate being substantially free of cosmetic defects, said components being used in such proportions to produce a photochromic aminoplast resin polymerizate having a Fischer microhardness of from at least 45 to not more than 180 Newtons per $mm^2$, as measured with a Fischerscope® H-100 using a 100 milliNewton load, 30 load steps and 0.5 second pauses and exhibiting an 85° F. ΔOD of at least 0.15 after 30 seconds and at least 0.47 after 8 minutes, and a bleach rate of not more than 180 seconds—all as measured in the 85° F. Photochromic Performance Test.

23. The photochromic article of claim 22 wherein said polymerizable composition further comprises a catalytic amount of catalyst.

24. The photochromic article of claim 22 wherein said article is a lens.

25. The photochromic article of claim 24 wherein said lens has a thickness of at least 0.5 millimeters.

* * * * *